3,225,071
ARENE GROUP VIB METAL TRICARBONYLS AND PROCESS FOR PREPARING SAME
Mark Crosby Whiting, Oxford, England, assignor to Ethyl Corporation, New York, N.Y., a corporation of Virginia
No Drawing. Filed Nov. 27, 1963, Ser. No. 326,399
16 Claims. (Cl. 260—397.2)

This application is a continuation-in-part of co-pending application Serial No. 4,018 filed January 22, 1960.

This invention relates to a novel process for the preparation of substituted arene Group VIB metal tricarbonyls and to novel compounds produced thereby.

More specifically, it relates to a novel process for the preparation of substituted arene Group VIB metal tricarbonyls which comprises a nucleophilic displacement of a halogen in a halo-substituted arene Group VIB metal tricarbonyl.

As described in my copending application Serial No. 4,018, filed January 22, 1960, I have previously discovered that nucleophilic substitutions are more readily carried out with an arene Group VIB metal tricarbonyl than they are with a parent aromatic compound. In said copending application, I describe nucleophilic substitutions of halogen-substituted arene Group VIB metal tricarbonyls using nucleophilic reagents of intermediate activity such as alkali metal alkoxides and alkali metal aryloxides, and demonstrated the utility of a polar reaction medium in reactions of this type.

This application describes a preferred embodiment of my invention; namely, the use of dimethyl sulfoxide as a polar reaction medium in nucleophilic substitutions of arene Group VIB metal tricarbonyls. As illustrated below, nucleophilic substitutions of arene Group VIB metal tricarbonyls are very readily carried out in dimethyl sulfoxide and, in some instances, the reaction is essentially complete in only a few minutes.

Another decided advantage of dimethyl sulfoxide is that nucleophilic reactants of the type employed in this invention are conveniently prepared in that solvent; Corey et al., J. Am. Chem. Soc., 84, 866 (1962) and Price et al., Chem. and Ind., 40, 775 (1963).

An object of this invention is to provide a novel process for the preparation of substituted arene Group VIB metal tricarbonyls. A further object is to provide novel arene Group VIB metal tricarbonyls. Still another object is to provide a process for the preparation of substituted Group VIB metal tricarbonyls using dimethyl sulfoxide as a reaction medium. Other objects of this invention will be apparent from the following detail description and appended claims.

The objects of this invention are accomplished by providing a process for the preparation of substituted arene Group VIB metal tricarbonyls, which comprises a nucleophilic substitution of a halogen-substituted arene Group VIB metal tricarbonyl in the presence of dimethyl sulfoxide.

The process of this invention comprises reacting, in the presence of dimethyl sulfoxide, a halogen-substituted arene Group VIB metal tricarbonyl with a nucleophile; i.e., an anion or other negatively charged particle capable of reacting with a positively polarized carbon atom.

The nucleophiles employed in my process are the anions or other negatively charged particles within alkali metal nucleophilic reagents. These reagents are obtained by replacing a hydrogen atom in carbon, oxygen, sulfur and nitrogen acids, with an alkali metal atom. Carbon, oxygen, sulfur and nitrogen acids are compounds which contain a replaceable hydrogen atom bonded to a carbon, oxygen, sulfur or nitrogen atom respectively. Preferred acids are oxygen, sulfur and nitrogen acids.

Typical preferred acids are triaryl methanes, ketones, cyclopentadienes, acetylenes, alcohols, phenols, mercaptans, primary and secondary amines, and amides having at least one hydrogen bonded to the amido nitrogen atom. Hence, a preferred process of this invention comprises reacting, in the presence of dimethyl sulfoxide, a halogen-substituted arene Group VIB metal tricarbonyl, with a nucleophilic reagent selected from the class consisting of alkali metal alcoholates, alkali metal phenolates, alkali metal mercaptolates, alkali metal aminates, alkali metal amidates, alkali metal cyclopentadienides, alkali metal acetylides, alkali metal triaryl methanides, and alkali metal ketonides.

A highly preferred embodiment of this invention comprises a process for the preparation of a substituted arene Group VIB metal tricarbonyl having the formula:

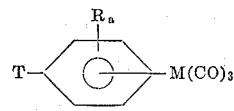

wherein

R is an alkyl radical having from 1 to about 3 carbon atoms,
$a$ is an integer having a value of zero to three,
M is a Group VIB metal, and
T is a nucleophile selected from the class consisting of alkoxide, phenoxide, amino, amido, cyclopentadienyl, mercapto, alkynyl, triaryl methyl, and ketonyl radicals;

said process comprising reacting, in the presence of dimethyl sulfoxide, a halogen-substituted arene Group VIB metal tricarbonyl having the formula:

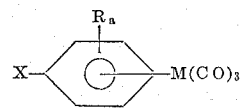

wherein X is a halogen, and R, $a$, and M are as defined above, with an alkali metal nucleophilic reagent having the formula M'T, wherein M' is an alkali metal and T is a negatively charged particle selected from the class consisting of alkoxide, phenoxide, mercapto, amino, amido, cyclopentadienyl, alkynyl, triaryl methyl and ketonyl. This embodiment can be illustrated by the following equation wherein DMSO is dimethyl sulfoxide.

(A)

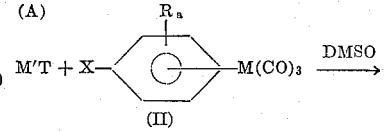

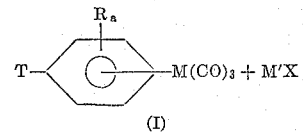

As illustrated, the process of this invention comprises a replacement of a halogen (bonded to an aromatic ring within an arene Group VIB metal tricarbonyl) with another nucleophile. In other words, the attacking nucleophile, T, displaces the halogen and bonds to the aromatic ring.

Any halogen-substituted arene Group VIB metal tricarbonyl which is stable under the reaction conditions employed, and which does not contain bulky substituents that retard the process by steric hindrance, is applicable. Preferred compounds are the fluoride, chloride, and bromide-substituted arene Group VIB metal tricarbonyls.

Preferably, the aromatic moiety bonded to the metal tricarbonyl fragment contains from 6 to about 15 carbon atoms and an isolated benzene nucleus. An isolated benzene nucleus is free from carbon-carbon unsaturation adjacent to the benzene ring.

Preferred halogen-substituted arene Group VIB metal tricarbonyls do not contain a fused ring system such as the tetralin molecule. In other words, only univalent hydrocarbon radicals such as alkyl radicals are bonded to the benzene ring.

Highly preferred arene Group VIB metal tricarbonyls are the benzene Group VIB metal tricarbonyls and alkyl substituted benzene Group VIB metal tricarbonyls described by Formula II above.

Illustrative but non-limiting examples of arene Group VIB metal tricarbonyls applicable in the instant process include fluorobenzene chromium tricarbonyl, fluorobenzene molybdenum tricarbonyl, fluorobenzene tungsten tricarbonyl, o-fluorotoluene chromium tricarbonyl, m-fluorotoluene molybdenum tricarbonyl, p-fluorotoluene tungsten tricarbonyl, 1,3,5-trimethylfluorobenzene chromium tricarbonyl, 2,3-diethylfluorobenzene molybdenum hexacarbonyl, 1,3,5 - diisopropylfluorobenzene tungsten tricarbonyl, 1-methyl-2,4-diethyl fluorobenzene chromium tricarbonyl and the like. Preferred compounds are the nonhydrocarbon substituted compounds such as fluorobenzene chromium tricarbonyl, chlorobenzene molybdenum tricarbonyl, and bromobenzene tungsten tricarbonyl. A highly preferred compound is fluorobenzene chromium tricarbonyl.

Halogen-substituted arene Group VIB metal tricarbonyls are conveniently prepared by reacting the corresponding halogen-substituted aromatic compound with a Group VIB metal hexacarbonyl; viz., chromium, molybdenum or tungsten hexacarbonyl. The reaction is preferably carried out in a polar solvent, as described in my copending application cited above.

The reaction of alkali metal alcoholates with halogen-substituted arene Group VIB metal tricarbonyls, according to the process of this invention, is illustrated by the following equation wherein R' is a hydrocarbon radical.

(B)

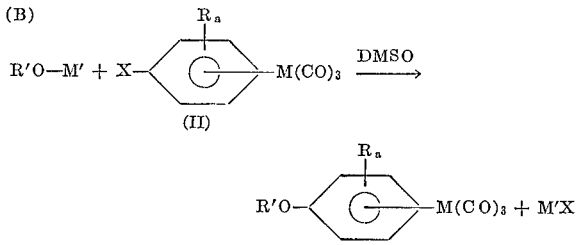

As illustrated, the essential feature of the alkali metal alcoholate is the oxygen atom in the alkoxide radical (or anion). That atom has the requisite electron density to displace the halogen and to bond to the aromatic ring after the halogen atom is displaced. The equation also demonstrates that the hydrocarbon radical within the nucleophilic reagent is not altered by the process. Hence, the nature of the hydrocarbon radical is not critical.

Hence, alkali metal alcoholates derived from any alcohol that (A) has a hydroxy group with a replaceable hydrogen atom and (B) an inert organic radical bonded to the hydroxy groups, are applicable. The hydroxy group may be bonded to a primary, secondary, or tertiary carbon atom. In other words, primary, secondary and tertiary alcohols yield applicable metal alcoholates.

Inert organic radicals are stable and are free of substituents which undergo extraneous side reactions. Thus, radicals of this type do not react with either dimethyl sulfoxide or the halogen-substituted arene Group VIB metal tricarbonyl. Typically, the radical is a hydrocarbon radical, either saturated or unsaturated. Inert saturated and unsaturated radicals which are applicable in this process are free of hydrogens that can be replaced with an alkali metal atom, when the alcohol is contacted with an alkali metal-containing base to form the alkali metal alcoholate.

The size of the inert radical is not citical and alcoholates having up to 30 carbon atoms are conveniently employed in this process. Preferred alcoholates are derived from alcohols having up to 20 carbon atoms, and the sterols. Highly preferred alcohols are cholesterol and alcohols having up to about 13 carbon atoms.

Primary alcohols are those which contain the —$CH_2OH$ group bonded to either a hydrogen radical or a hydrocarbon radical. The hydrocarbon radical may be either a straight or branched chain and it may contain a cyclic group attached to the chain. The cyclic group may be either aromatic or non-aromatic. Preferred non-aromatic cyclic groups have 5 or 6 carbon atoms.

Preferred hydrocarbon radicals are selected from the class consisting of alkyl, alkenyl, aralkyl and aralkenyl radicals. Highly preferred radicals are alkyl and aralkyl radicals.

Illustrative but non-limiting examples of primary alcohols which yield applicable alkali metal alcoholates are methanol, ethanol, n-propyl alcohol, n-butyl alcohol, isobutyl alcohol, isoamyl alcohol, neopentyl alcohol, n-octyl alcohol, n-decyl alcohol, cetyl alcohol, myristyl alcohol, benzyl alcohol, 3-octene-1-ol, 4-decene-1-ol, cyclohexylmethanol, 2-cyclopentylethanol, o-isopropylbenzyl alcohol, and the like.

Secondary alcohols have the

radical bonded to two carbon atoms. The carbon atoms may be within a ring or straight or branched chains. Thus, isopropyl alcohol, sec-butanol, sec-amyl alcohol, sec-octanol, benzhydrol, and the like, typify non-cyclic secondary alcohols which yield alkali metal alcoholates that are applicable in this invention. Cyclic secondary alcohols such as cyclohexanol, 3-cyclohexenol, cyclopentanol and the like also yield applicable alcoholates. A preferred class of alkali metal alcoholates are those derived from sterols. The formula of cholesterol, a typical sterol is given below.

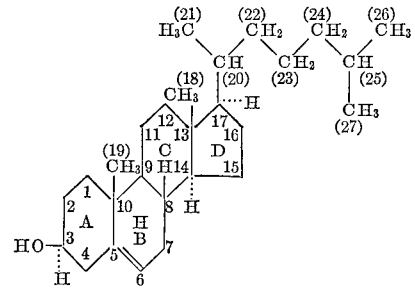

The radical derived from cholesterol by removing the hydroxy group is designated as the cholesteryl radical. The radical formed by removal of the hydrogen atom from the hydroxy group is the cholestroxy radical. Other sterols which are applicable in this process are stigmasterol, vitamin $D_2$ vitamin $D_3$, cholic acid, strophanthidin, estriol, androsterone and corticosterone.

Tertiary alcohols contain the radical

The three unsatisfied valences in the formula are bonded to carbon atoms which are within straight or branched chains or rings. Typical tertiary alcohols which yield alkali metal alcoholates that are applicable in the process of this invention are triphenyl carbinol, tris(p-tolyl) carbinol, tris(cyclohexyl) carbinol, tertbutyl alcohol and the like.

Alkali metal phenolates are also applicable in this invention. Typical phenols which yield applicable phenolates include phenol, o, m, and p-cresol, p-nonylphenol, 4-hydroxybiphenyl and the like.

Alkali metal alcoholates and phenolates derived from polyhydroxy alcohols by the replacement of two or more hydrogen atoms from two or more hydroxy groups are also applicable in this process. When alcoholates and phenolates of this type are reacted with halogen-substituted arene Group VIB metal tricarbonyls according to this process, they can form polysubstituted products; that is, compounds which contain two or more arene Group VIB metal tricarbonyl moieties bonded together by a bridging group. In some instances, a mixture of products is obtained. Typical mixtures contain polysubstituted products and compounds similar to those formulated in Equation B; i.e., compounds having only one arene Group VIB metal tricarbonyl moiety.

Preferred alkali metal alcoholates and phenolates have the formula $R^1$–OM' wherein M' is an alkali metal and $R^1$ is a univalent radical selected from the class consisting of the cholesteryl radical and hydrocarbon radicals having from 1 to about 13 carbon atoms, said hydrocarbon radical being selected from the class consisting of alkyl, cycloalkyl, aralkyl, aryl and alkaryl radicals.

Alkali metal mercaptolates, the sulfur analogs of the alcoholates and phenolates, react with halogen-substituted arene Group VIB metal tricarbonyls in a manner similar to Equation B above. Hence, the essential feature of the mercaptolates is the sulfur atom, which has sufficient electronegativity to displace a halogen from an aromatic ring and bond to the ring after the halogen is displaced.

As with the alcoholates and phenolates, the organic radical bonded to the sulfur atom is not directly involved in my process. Therefore, the size and configuration of the organic radical is not critical.

Alkali metal mercaptolates which are analogous to the alcoholates and phenolates described and illustrated above, are applicable in my process. Hence, mercaptolates having up to about 30 carbon atoms are conveniently employed. Furthermore, saturated and unsaturated mercaptans yield applicable mercaptolates. Preferred mercaptolates are derived from alkyl, cycloalkyl, aralkyl, alkenyl, cycloalkenyl, aryl, alkaryl mercaptans. Highly preferred mercaptolates have the formula $R^3S$—M' wherein M' is an alkali metal and $R^3$ is a univalent hydrocarbon radical having from two to about 13 carbon atoms, said radical being selected from the class consisting of alkyl, cycloalkyl, aralkyl, aryl and alkaryl radicals.

Illustrative but non-limiting examples of applicable mercaptans include methyl mercaptan, ethyl mercaptan, isopropyl mercaptan, neopentyl mercaptan, cyclohexyl mercaptan, benzyl mercaptan, p-dodecylbenzyl mercaptan, phenyl mercaptan, 4-octene mercaptan, 2-naphthyl mercaptan and the like.

Alkali metal amidates react with a halogen-substituted arene Group VIB metal tricarbonyl according to the following equation.

(C)

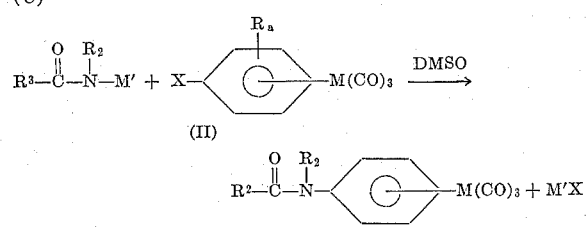

The process is analogous to the reaction of alcoholates, phenolates and mercaptolates. Hence, the configuration and size of the acyl radical bonded to the amido nitrogen atom is not critical. Therefore, a wide variety of amides yield applicable alkali metal alcoholates.

The organic radical bonded to the carbonyl group ($R^3$ in the above formula) can be of the same type as that within the alcoholates, phenolates, and mercaptolates described above. Preferably, the radical is a hydrocarbon radical having up to about 30 carbon atoms. Highly preferred radicals have up to about 20 carbon atoms and are selected from the class consisting of alkyl, cycloalkyl, aralkyl, alkenyl, cycloalkenyl, aryl and alkaryl radicals. Very highly preferred radicals have up to about 13 carbon atoms and are selected from the class consisting of alkyl, cycloalkyl, aralkyl, aryl and alkaryl radicals.

The radical $R^2$ is selected from the class consisting of hydrogen and univalent hydrocarbon radicals having up to about 30 carbon atoms. Preferably, $R^2$ is hydrogen or a hydrocarbon radical having up to about 13 carbon atoms selected from the class consisting of alkyl, cycloalkyl, aralkyl, aryl and alkaryl radicals.

Typical amides which yield applicable metal amidates are exemplified by the following non-limiting examples: acetamide, 2-cyclohexylacetamide, cyclohexanecarboxylic acid amide, 2-cyclohexenecarboxylic acid amide, propionamide, benzamide, p-dodecylbenzamide, 3,5-diethylbenzamide, 3-phenylbutyramide, 3[o-methyl]phenylhexylamide n-butyramide, n-heptylamide, isovalerylamide, stearamide, o-toluamide, p-toluamide, N-methylacetamide, N-tridecyl-2-cyclohexyl acetamide, cyclohexane carboxylanilide, N-cyclohexyl-2-cyclohexene carboxylic acid amide, N-[3-ethyl]phenylisovalerylamide, and the like.

Highly preferred alkali metal amidates have the formula

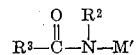

wherein

M' is an alkali metal;

$R^2$ is a univalent radical selected from the class consisting of hydrogen and hydrocarbon radicals having from one to about 13 carbon atoms, said radicals being selected from the class consisting of alkyl, cycloalkyl, aralkyl, aryl and alkaryl radicals; and $R^3$ is a univalent hydrocarbon radical having from 2 to about 13 carbon atoms which is selected from the class consisting of alkyl, cycloalkyl, aralkyl, aryl and alkaryl radicals.

Alkali metal aminates react with halogen-substituted arene Group VIB metal tricarbonyls as illustrated by the following equation.

(D)

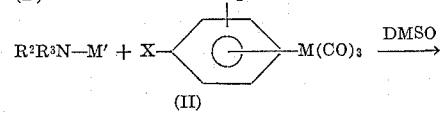

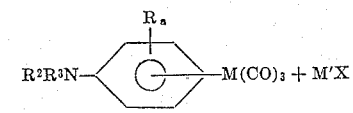

The process is analogous to the reaction of alcoholates, phenolates, mercaptolates and amidates described above. The essential feature of the alkali metal aminate is the amino nitrogen atom which has sufficient electronegativity to displace a halogen from an aromatic ring within a Group VIB metal tricarbonyl and bond to the ring after the halogen is displaced. As with the alcoholates and phenolates, the organic radicals bonded to the nitrogen atom are not involved in the process to an appreciable extent. Hence, the size and configuration of those radicals is not critical.

The organic radicals bonded to the amino nitrogen atom are of the same class as those within the alcoholates, phenolates and mercaptolates described above. Preferred organic radicals are hydrocarbon radicals having up to about 13 carbon atoms. Highly preferred radicals have up to about 13 carbon atoms and are selected from the class consisting of alkyl, cycloalkyl, aralkyl, aryl and alkaryl radicals.

Both primary and secondary amines yield applicable alkali metal aminates. In aminates derived from secondary amines, $R^2$ and $R^3$ in the formulas in Equation D are organic radicals. In aminates derived from primary amines, R² is equal to hydrogen.

Illustrative but non-limiting examples of amines which are applicable in this process include isopropylamine, ethyl methylamine, tert-butylamine, diethylamine, iso-amylamine, n-amylamine, n-hexylamine, aniline, o-toluidine, N-methyl-m-toluidine, N-methyl-o-toluidine, N-hexyl-p-toluidine, N-tridecylaniline, cyclohexylamine, dicyclohexylamine, N-cyclohexylaniline, cyclopentyl methylamine, 2-cyclohexylethylamine, phenylethylamine, diphenylethylamine, and the like.

Preferred alkali metal aminates of the type described and illustrated above have the formula $R^2R^3N—M'$ wherein M' is an alkali metal, $R^2$ is a univalent radical selected from the class consisting of the hydrogen radical and hydrocarbon radicals having from 1 to about 13 carbon atoms, said hydrocarbon radicals being selected from the class consisting of alkyl, cycloalkyl, aralkyl, aryl and alkaryl radicals; and $R^3$ is a univalent hydrocarbon radical having from 2 to about 13 carbon atoms which is selected from the class consisting of alkyl, cycloalkyl, aralkyl, aryl and alkaryl radicals.

Alkali metal aminates derived from primary amines constitute a highly preferred class of reactants. As illustrated by Equation $E_1$ below, aminates of this type react to yield substituted aniline Group VIB metal tricarbonyls of Formula III. However, as illustrated by Equation $E_2$, the substituted aniline chromium tricarbonyl can react with another molecule of halogen-substituted arene Group VIB metal tricarbonyl to yield compounds having Formula IV.

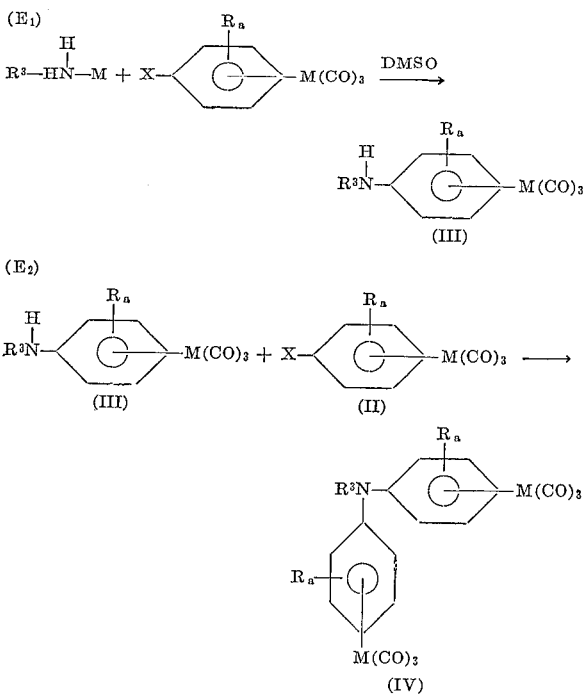

In preferred compounds having Formula IV, R is an alkyl radical having from 1 to about 3 carbon atoms, $a$ is an integer having a value of zero to three, and M is a Group VIB metal. Preferably, $R^3$ is a univalent hydrocarbon radical having from 2 to about 13 carbon atoms which is selected from the class consisting of alkyl, cycloalkyl, aralkyl, aryl and alkaryl radicals. In highly preferred compounds of Formula IV $R^3$ is selected from the class consisting of the phenyl radical and aralkyl radicals having up to 13 carbon atoms. Thus, $R^3$ may be phenyl, o-tolyl, p-tolyl, m-ethylphenyl, 1,3,5-triethylphenyl, 3,4,5-triisopropyl and the like.

Another highly preferred class of alkali metal aminates are those derived by replacing the hydrogen bonded to the nitrogen atom in pyrrole, and substituted derivatives thereof, with an alkali metal atom. Aminates of this type react with halogen-substituted arene Group VIB metal tricarbonyls in a manner analogous to Equation D. Preferred aminates of this type have the formula:

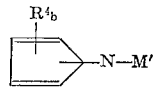

wherein M' is an alkali metal and $R^4$ is an alkyl radical having from 1 to about 4 carbon atoms and $b$ is an integer having a value of zero to four. Typical pyrroles which yield aminates of this type are pyrrole, 2-methylpyrrole, 2,4-dimethylpyrrole, 2,3,4,5-tetramethyl pyrrole, 2-ethyl pyrrole, 3-propylpyrrole, 2-methyl-3-butyl-5-ethylpyrrole, 2,3,4,5-tetraisobutyl pyrrole, and the like.

Alkali metal cyclopentadienides react according to this process as illustrated by the following equation.

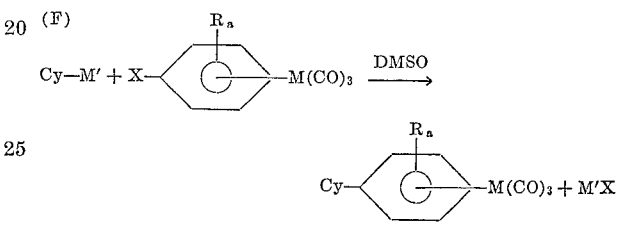

The cyclopentadienyl radical can be derived from four generic types of cyclopentadienes which have at least one methylene hydrogen. Hence, the cyclomatic radical may be derived from cyclopentadiene or cyclopentadienes having univalent hydrocarbon radicals such as alkyl, aralkyl, cycloalkyl, alkaryl and aryl radicals. Preferably, the univalent radicals have from one to about 8 carbon atoms. Thus, such radicals as methyl, isopropyl, tert-butyl, benzyl, α-phenylethyl, phenyl, cyclohexyl, cyclohexyl ethyl, and the like may appear as substituents on the cyclopentadienyl ring. The cyclopentadienyl radical may be poly-substituted. Preferably, however, the total number of carbon atoms within the ring, plus the carbon atoms of the substituent radicals, does not exceed about 13.

The second type of cyclomatic hydrocarbon which yields applicable alkali metal cyclopentadienides is represented by the general formula

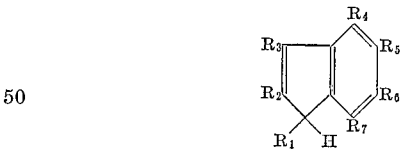

wherein each of the R groups can be the same or different and is selected from the group consisting of hydrogen and organic radicals. Illustrative examples of such cyclomatic radicals are indenyl, 3,4-diethylindenyl, 3-phenylindenyl, and the like.

The third type of cyclomatic hydrocarbon which yields applicable alkali metal cyclopentadienides is a radical of the fluorenyl type which can be represented by the general formula

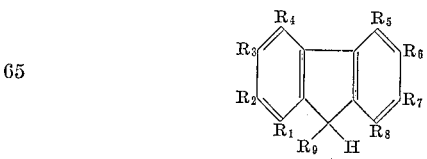

Again, each of the R groups in the above formula can be alike or different and is selected from the class consisting of hydrogen and organic radicals, similar to those described above. Thus, radicals such as the fluorenyl, the 3-ethyl fluorenyl, the 4,5-dimethyl fluorenyl radicals, and the like are applicable in this invention.

The fourth type of cyclomatic compound can be represented by the general formula

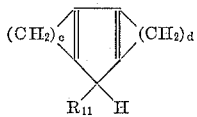

wherein $c$ and $d$ can be the same or different and are small whole integers including zero and excluding one, and wherein $R_{11}$ is selected from the class consisting of hydrogen and organic radicals. Illustrative examples of this type of radical which contains the cyclopentadienyl configuration include 4,5,6,7-tetrahydroindenyl, 1,2,3,4,5,6,7,8-octahydrofluorenyl, 6-methyl, 4,5,6,7-tetrahydroindenyl, and the like.

Preferred cyclopentadienes are cyclopentadiene and indene. When reacted with an alkali metal, these compounds yield alkali metal cyclopentadienide, $M'—C_5H_5$, and alkali metal indenide, $M'—C_9H_7$, respectively.

Alkali metal acetylides react with halogen-substituted arene Group VIB metal tricarbonyls according to this process as illustrated by the following equation.

(G)
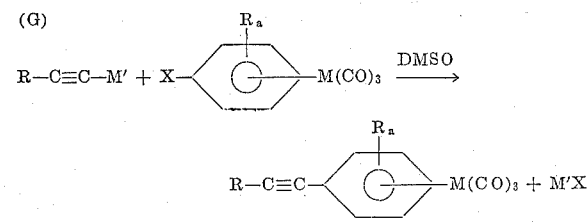

The radical R may be any inert radical such as those in the alcoholates and phenolates described above. Preferably, R is a hydrocarbon radical, saturated or unsaturated. Aliphatic, alicyclic or aromatic radicals having one to about 13 carbon atoms are preferred. Radicals of this type include alkyl, cycloalkyl, aralkyl, aryl, alkaryl radicals and the like.

Illustrative but non-limiting examples of acetylenes which yield applicable alkali metal acetylides include methylacetylene, isopropylacetylene, phenylacetylene, benzylacetylene, cyclohexylacetylene, p-tolylacetylene, and the like.

Alkali metal triaryl methanides react with halogen-substituted arene Group VIB metal tricarbonyls as illustrated by the following equation.

(H)
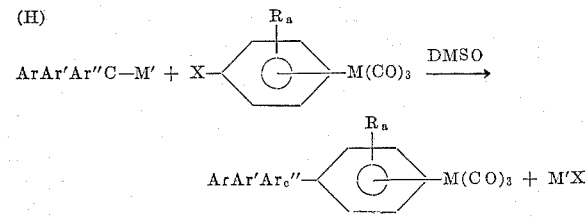

As illustrated by the equation, the process is similar to the reaction of the other alkali metal nucleophilic reagents described above. Therefore, the size and configuration of the aryl radicals within the triaryl alkali metal reactant are not critical.

Preferably, the aryl radical has up to about 10 carbon atoms and is selected from the class consisting of the phenyl radical, alkyl substituted phenyl radicals, and the naphthyl radical. Illustrative but non-limiting examples of applicable aryl radicals are phenyl, o-, m-, and p-tolyl, ethylphenyl, diethylphenyl, 1,3,4,5-tetramethylphenyl, tert-butylphenyl, cumenyl, naphthyl, and the like.

Preferred alkali metal triarylmethanides are derived from triarylmethanes wherein the three aryl radicals are identical. For example, a highly preferred triarylmethane, which yields an applicable alkali metal triarylmethanide, is triphenylmethane.

Ketones having at least one replaceable hydrogen atom on a carbon atom adjacent to the carbonyl group are applicable in this process. The reaction of alkali metal ketonides with a halogen substituted arene Group VIB metal tricarbonyl is illustrated by the following equation.

(I)
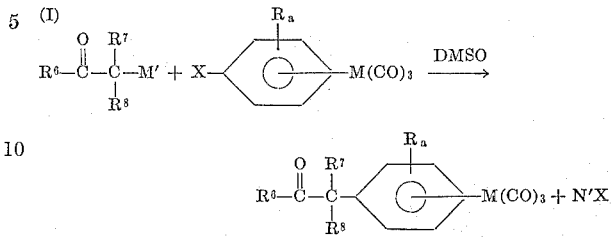

As illustrated, the various radicals indicated by $R^6$, $R^7$, and $R^8$ in the above equation are not involved in the process to an appreciable extent. Hence, the size and configuration of these radicals is not critical. Therefore, applicable ketones can have radicals similar to those in the applicable alcoholates and phenolates.

Preferably, the alkali metal ketonides are derived from ketones having up to about 18 carbon atoms. Both cyclic and acyclic ketones are applicable.

The radicals $R^6$, $R^7$, and $R^8$ within the preferred acyclic ketones are selected from the class consisting of alkyl, cycloalkyl, aralkyl, aryl and alkaryl radicals. Preferred radicals have up to about 13 carbon atoms. Preferably, the total number of carbon atoms in $R^6$, $R^7$, and $R^8$ does not exceed about 13.

Illustrative but non-limiting examples of ketones which yield applicable alkali metal ketonides include acetone, methylethyl ketone, isopropyl methyl ketone, benzyl ketone, tert-butyl ethyl ketone, cyclohexylmethyl ketone, phenyl n-propyl ketone, acetophenone, decylpropyl ketone, p-butylphenylmethyl ketone, and the like. Preferred acyclic ketones are acetone and methylethyl ketone.

Cyclic ketones that are applicable in the instant process include cyclopentanone, cyclohexanone, cycloheptanone, and hydrocarbon substituted derivatives thereof. Preferred hydrocarbon-substituted cyclic ketones have one or more radicals having up to about eight carbon atoms which are selected from the class consisting of alkyl, aryl, cycloalkyl, aralkyl, and alkaryl radicals. Highly preferred hydrocarbon-substituted cyclic ketones have up to about 13 carbon atoms. The most preferred cyclic ketone is cyclohexanone.

Alkali metal alcoholates, phenolates, mercaptolates, aminates, amidates, cyclopentadienides, acetylides, triaryl methanides and ketonides can be prepared by reacting the corresponding organic compound with an alkali metal. For example, sodium methoxide can be prepared by adding metallic sodium in small portions to excess methanol and, after the reaction is complete, removing the excess methanol by distillation. Alternatively, solid sodium methoxide can be obtained by preparing a suspension of sodium metal in ether and then adding an equivalent amount of methanol to the suspension. Preferred alkali metals are lithium, sodium and potassium. Sodium is highly preferred.

The process of this invention is carried out by contacting the reactants in the presence of dimethyl sulfoxide. Preferably, at least one mole of dimethyl sulfoxide is employed for each mole of reactant. However, somewhat less than one-half of a mole of dimethylsulfoxide can be employed, if desired. Up to about 50 to 100 or 1000 or more moles of dimethyl sulfoxide can be employed, if desired. The upper limit is not critical and is dependent on economics, size of the reaction vessel, ease of separation of the product, and similar considerations. Preferably, solvent quantities of dimethyl sulfoxide are employed. That is, the reactants are dissolved in dimethyl sulfoxide. However, slurries or suspensions can be employed if desired. Preferred slurries or suspensions contain enough dimethyl sulfoxide to make a thin slurry or suspension. Thin slurries or suspensions are more easily handled than thick suspensions.

The dimethyl sulfoxide can be mixed with one or more inert solvents such as a hydrocarbon or mixture thereof. Typical hydrocarbon solvents are nonane, ligroin, benzene, toluene and the like. Ethers such as diethylether, dibutylether and the like can also be mixed with dimethyl sulfoxide.

Preferably, the process is carried out by contacting equimolar amounts of the alkali metal nucleophilic reagent and the halogen-substituted arene Group VIB metal tricarbonyl. However, molar excesses of either reactant can be employed if desired. For example, an excess of up to about 10 or 20 moles of either reactant can be employed. In many instances, the halogen-substituted arene Group VIB metal tricarbonyl is more expensive than the nucleophilic reagent. Hence, in these instances it is more feasible to use an excess of the alkali metal nucleophilic reagent if an excess of a reactant is required.

The process of this invention is carried out at a temperature between the freezing point of dimethyl sulfoxide and about 70° C. A preferred temperature range is from about 10 to about 45° C. A highly preferred range is from about 15 to about 25° C. A very highly preferred temperature is room temperature.

The process proceeds well under atmospheric pressure. However, pressures as high as 500 p.s.i. can be employed if desired. Sub-atmospheric pressure can also be employed; e.g., pressures as low as about 50 mm. Hg.

The process can be carried out in the presence of air or, if desired, under an inert gas.

The reaction time is not a truly independent variable but is dependent to some extent on the other process conditions employed. For example, higher temperatures usually enhance the rate of reaction and consequently decrease the reaction time. Many reactions are completed within a few minutes. However, reaction times as long as 60 hours can be employed if desired.

As described above, the process of this invention comprises contacting an alkali metal containing nucleophilic reactant with a halogen-substituted arene Group VIB metal tricarbonyl in the presence of dimethyl sulfoxide. A convenient method for the preparation of a dimethyl sulfoxide solution of an alkali metal-containing nucleophilic reactant comprises adding the organic compound, from which the alkali metal reactant is derived, to a dimethyl sulfoxide solution of an alkali metal salt of the conjugate base of dimethyl sulfoxide.

Hence, a preferred embodiment of this invention comprises two steps: (A) the preparation of a dimethyl sulfoxide solution of an alkali metal nucleophilic reagent by reacting, in the presence of dimethyl sulfoxide, an organic compound, from which the alkali metal reagent is derived, and an alkali metal salt of the conjugate base of dimethyl sulfoxide, and (B) reacting said alkali metal reagent in the dimethyl sulfoxide solution thereby produced with a halogen-substituted arene group VIB metal tricarbonyl, to replace a halogen radical from said arene Group VIB metal tricarbonyl with the organic radical derived from said alkali metal reagent.

A highly preferred embodiment of this invention comprises a process for the preparation of a substituted arene Group VIB metal tricarbonyl having the formula:

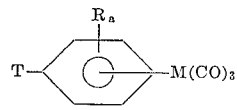

wherein

R is an alkyl radical having from 1 to about 3 carbon atoms,
$a$ is an integer having a value of zero to three,
M is a Group VIB metal, and
T is a substituent group selected from the class consisting of alkoxide, phenoxide, mercapto, amino, amido, cyclopentadienyl, alkynyl, triaryl methyl, and ketonyl radicals, said process comprising (A) reacting, in the presence of dimethyl sulfoxide, a compound selected from the class consisting of alcohols, phenols, mercaptans, primary and secondary amines, amides having at least one hydrogen bonded to the amido nitrogen atom, terminal acetylenes having at least three carbon atoms, cyclopentadienes, ketones and triaryl methanes; with an alkali metal salt of the conjugate base of dimethyl sulfoxide, said salt having the formula

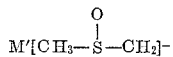

wherein M' is an alkali metal; whereby a dimethyl sulfoxide solution of an alkali metal nucleophilic reagent having the formula M'T is produced, wherein M' and T are as defined above; and (B) subsequently reacting said alkali metal nucleophilic reactant in said dimethyl sulfoxide solution with a halogen-substituted arene Group VIB metal tricarbonyl having the formula

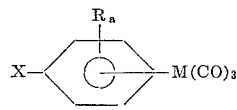

wherein X is a halogen, and R, $a$, and M are as defined above.

The alkali metal salts of the conjugate base of dimethyl sulfoxide are prepared by reacting dimethyl sulfoxide with an alkali metal hydride. The preparation of methylsulphenyl sodium, "dimsylsodium," is described in Example I below and in Corey et al. and Price et al. supra.

Dimsylsodium (and dimsyllithium, dimsylpotassium, and the like) react with an acid to form the conjugate base of that acid and dimethyl sulfoxide. This reaction is illustrated by the following equation illustrating the reaction of dimsylsodium with triphenylmethane.

(J) 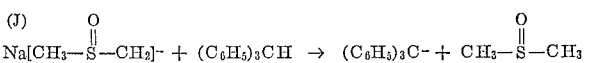

Reactions of the type illustrated by the foregoing equation are conveniently carried out in the presence of dimethyl sulfoxide. Therefore, the dimsylsodium solution prepared as in Example I can be used per se and the strong base need not be isolated from the solution.

The reactions of dimsylsodium and an acid are carried out in the absence of air. A convenient apparatus which may be employed is described by Baumgarten et al., J. Am. Chem. Soc., 66, 1039 (1944), modified as follows.

In the modified apparatus a micro buret with an elongated capillary outlet fitted into a sealing cap is employed. The cap is fitted into one aperture of a two-necked flask and this is fitted onto the buret. The other aperture of the two-necked flask is closed with a stopper. A flow of nitrogen into and out of the flask is maintained by passing nitrogen through two hypodermic needles inserted through the sealing cap into the flask.

Examples of reactions of active hydrogen compounds with dimsylsodium are given in Example III.

In order to quantitatively transform the carbon, oxygen, sulfur or nitrogen acid to the corresponding alkali metal derivative, and to avoid an excess of the alkali metal salt of the conjugate base of dimethyl sulfoxide, it is preferred that the salt of the base and the organic acid be reacted in stoichiometric quantities. One method for carrying out a stoichiometric reaction comprises the addition of a measured quantity of both reactants. This can be effected by adding the requisite portion of a standardized solution of the salt of the conjugate base to the organic acid. A convenient method for carrying out the stoichiometric reaction comprises a titration of the organic acid with the sodium salt of the conjugate base.

The end point of the titration can be determined by any method known in the art. For example, the end point can be determined by conductometric or electrometric measurements. Use of a suitable indicator comprises a preferred method for the detection of the end point of the titration.

A suitable indicator is a compound which rapidly reacts with the first drop of excess base to form a colored species. Suitable indicators are triphenylmethane and diphenylmethane. Triphenyl methane, for example, reacts with the first drop of excess dimsylsodium according to Equation J to give the deeply colored anion $(C_6H_5)_3C^-$. Diphenylmethane reacts in an analogous manner. Other materials that can be employed as indicators are fluorene, trinitrobenzene, phenyl acetonitrile and ethyl phenylacetate.

The products of the process are either solids or liquids and can be separated from the reaction mixture by methods known in the art. A preferred separation technique comprises adding a comparatively large volume of dilute hydrochloric acid to the reaction mixture after the reaction is terminated and then extracting the aqueous mixture with an ether such as diethylether. The product can be separated from the extracting liquid by chromatography on activated alumina or by any other method known in the art.

The following examples further illustrate the process of this invention and the products produced thereby. All parts are by weight unless otherwise indicated.

The measured amount of dimsylsodium was the indicator blank. β-Naphthol, 0.144 part, was added to the solution. This discharged the purple color. Additional dimsylsodium was added, with shaking, until the color was just restored by one drop of the reagent. A series of titrations was carried out by further additions of β-naphthol, followed by the amount of dimsylsodium required to restore the purple color. The results were reproducible to within 0.02 ml. Calculation indicated that the dimsylsodium solution had a molarity of 0.92.

Solutions having a strength of up to about 2 M can be prepared.

EXAMPLE III

*Titration of active hydrogen compounds*

Many active hydrogen compounds were reacted by titration with dimsylsodium solution using triphenylmethane or diphenylmethane as the indicator. All experiments were carried out on a microscale (ca. 0.4 millimole quantities). In most cases the mean of several measurements was taken and the deviation recorded.

Solid compounds were reacted as described for β-naphthol (Example II) while liquids were injected into the flask from a micro syringe, previously calibrated by injection of known volumes into a sealed flask which was weighed after each injection.

The results of these titrations are recorded in Table I.

As shown in Table I, glycerol reacts with 1.5 equivalents of dimsylsodium. Apparently glycerol forms a bimolecular anion having three OH . . . O⁻ groups.

TABLE I

| Acid | Mean reagent, moles spread | Acid | Mean reagent, moles spread |
| --- | --- | --- | --- |
| Oxygen acids: | | Nitrogen acids: | |
| 1. Acetic acid | 1.03±0.00 | 1. Diphenylamine | 0.99±0.01 |
| 2. Water | 1.00±0.03 | 2. Benzamide | 1.02±0.04 |
| 3. Methanol | 1.05±0.02 | 3. Pyrrole | 0.99±0.05 |
| 4. i-Propanol | 1.02±0.03 | 4. Phenylhydrazine | 0.97±0.01 |
| 5. n-Butanol | 0.98±0.04 | 5. Hydroxylamine HCl | 2.03±0.02 |
| 6. t-Butanol | 1.06±0.03 | Carbon acids: | |
| 7. Phenol | 1.02±0.02 | 1. Phenylacetylene | 0.99±0.07 |
| 8. 1-n-octanol | 0.96±0.03 | 2. Cyclohexanone | 1.00±0.05 |
| 9. 2-n-octanol | 0.94±0.03 | 3. Acetone | 0.99±0.04 |
| 10. t-Amyl alcohol | 1.01±0.02 | 4. Indene | 0.98±0.01 |
| 11. Benzyl alcohol | 0.99±0.02 | 5. Cyclopentadiene | 0.99±0.02 |
| 12. Cholesterol | 1.10 | 6. Nitromethane | 0.99±0.02 |
| 13. Ethylene glycol | 1.02±0.03 | 7. Methyl acetate [2] | 1.62±0.14 |
| 14. Diethylene glycol | 2.04±0.06 | 8. Ethyl acetate [2] | 1.55±0.19 |
| 15. Glycerol [1] | 1.5 ±0.1 | 9. $CH_2(CN)_2$ | 1.04±0.02 |
| Sulphur acids: | | 10. $CH_2(COOEt)_2$ | 1.00±0.00 |
| 1. Benzyl mercaptan | 0.97±0.01 | 11. $NC\cdot CH_2COOEt$ | 1.07±0.02 |

[1] With both $\varphi_3CH$ and $\varphi_2CH_2$ as indicators.
[2] Indicates slow reaction.

EXAMPLE I

*Preparation of dimsylsodium*

Sodium hydride, 5 parts, is reacted with dry dimethyl sulfoxide, 220 parts, at 65–70° C. for two hours under a nitrogen atmosphere. The solution was cooled slowly and solid residues precipitated leaving a clear pale grey supernatant solution of dimsylsodium.

The supernatant solution is fairly stable if protected from air and loses only about 8 percent of its activity per week.

EXAMPLE II

*Standardization of dimsylsodium solution*

An anaerobic buret of the type described above was employed. Dry dimethyl sulfoxide, 2.2 parts, was injected into the flask. Nitrogen was passed into and out of the liquid via the hypodermic needles before the reagent was added. About 0.001 part of triphenylmethane was added to the dimethyl sulfoxide. Dimsylsodium solution was added dropwise (only 1 or 2 drops were required) until an intense purple color was formed indicating the formation of free triphenylmethyl carbanion.

This titration method for the production of conjugate bases of acids is broadly applicable to all oxygen acids, nitrogen acids, carbon acids and sulphur acids that have a $K_b$ lower than the $K_b$ of the alkali metal derivative of dimethylsulfoxide used as the titrant.

Among the oxygen acids which are applicable in this process are alcohols. Monohydroxy alcohols such as methanol, ethanol, n-butanol, the octanols, myristyl alcohol, and the like, are applicable. Polyhydroxy alcohols which are applicable in this process are illustrated by ethyleneglycol, diethyleneglycol, pinacol, dihydroxy acetone, and heptyl-1,7-diol. Alcohols containing an aromatic nucleus such as benzyl alcohol and phenol, hydrocarbon-substituted phenols, and hydrocarbon-substituted benzyl alcohols, are also applicable. Unsaturated alcohols such as 1-butene-4-ol and vitamin A are also applicable. Alcohols that have substituents other than carbon and hydrogen-containing groups are likewise applicable. Illustrative but not limiting examples of this type of alcohol are ethanol, picric acid, ethylene chlorohydrin, and the like. It is to be understood that the compounds given above are merely illustrative and not limiting.

Sugar and sugar derivatives such as erythrose, ribose, glucose, fructose, mannose, sucrose, maltose, chondroitin sulfate, cellulose and starch, can also be employed.

Non-limiting illustrative examples of the sterols that are applicable in this process are cholesterol, stigmasterol, vitamin $D_2$, vitamin $D_3$, cholic acid, strophanthidin, estriol, androsterone, and corticosterone.

Carboxylic acids, both monobasic and polybasic, are also applicable. Hence, compounds such as the fatty acids, oxalic acid and its homologs, benzoic acid and substituted benzoic acids, citric acid, maleic acid and tyrosine, are illustrative but not limiting examples of applicable acids. Halogen-substituted acids are also applicable.

Amines, aliphatic, aromatic and heterocyclic, are applicable. Primary and secondary amines are applicable in this process. Aniline, p-toluidine, pyrrole, ring-substituted anilines, and diphenylamine are illustrative amines. Amine derivatives such as hydrazines, hydroxylamine and the like are also applicable. Hydrocarbon and halogen-substituted anilines and pyrroles are applicable.

Carbon acids, compounds which contain a carbon atom bonded to one of a plurality of electron withdrawing groups that make the carbon atom basic, are applicable. Terminal acetylenes, ketones, nitromethane, cyclomatic hydrocarbons such as cyclopentadiene, fluorene and indene, malonic esters, toluene, malonitrile and the like are illustrative but not limiting examples of carbon acids that are applicable in this process.

EXAMPLE IV

*Preparation of alkoxy-arene chromium tricarbonyl compounds*

An alcohol (ca. 0.4 millimole) in dimethyl sulfoxide, 1 ml., was quantitatively converted into its alkoxide by titration with dimsylsodium using triphenylmethane as an indicator as described in Examples II and III. Fluorobenzene chromium tricarbonyl was then added to the reaction mixture. An immediate reaction occurred with evolution of heat in almost all cases. After about one minute, about 5 mls. of dilute hydrochloric acid (ca. 2 N) was added. The reaction mixture was then extracted into ether. The ether solution was chromatographed on activated alumina. The bands were eluted with petroleum ether and the product recrystallized. The results are summarized in Table II.

The yields obtained after chromatography (chr.) and recrystallization (cr.) are reported.

When the process is repeated except that sodium methoxide, sodium ethoxide, sodium n-octyl alcoholate and sodium cyclohexylmethanol alcoholate are employed in place of sodium isoamylalcoholate, the products are methoxybenzene chromium tricarbonyl, ethoxybenzene chromium tricarbonyl, n-octyloxybenzene chromium tricarbonyl and cyclohexyl methoxybenzene chromium tricarbonyl respectively.

EXAMPLE VI

Sodium isopropyl alcoholate is reacted with o-methylfluorobenzene chromium tricarbonyl in dimethyl sulfoxide solution at 70° C. The product is o-methyl-isopropoxybenzene chromium tricarbonyl. When the reaction is repeated using sodium-sec-butanol alcoholate and potassium cyclohexanol alcoholate, the product is o-methyl-sec-butoxybenzene chromium tricarbonyl and o-methylcyclohexanoxybenzene chromium tricarbonyl respectively.

EXAMPLE VII

Potassium triphenylmethyl alcoholate and sodium tert-butyl alcoholate are reacted with fluorobenzene chromium tricarbonyl in dimethyl sulfoxide solution at 10° C. The product is triphenylmethoxybenzene chromium tricarbonyl and tert-butoxybenzene chromium tricarbonyl respectively. When sodium phenolate is employed in place of sodium triphenyl methanol alcoholate, the product is phenoxybenzene chromium tricarbonyl. Similar results are obtained when bromobenzene chromium tricarbonyl is employed in the process.

EXAMPLE VIII

Sodium ethyl mercaptolate is reacted with 1,3,5-trimethyl fluorobenzene chromium tricarbonyl in dimethyl sulfoxide solution. The product is 1,3,5-trimethylethylmercaptobenzene chromium tricarbonyl. Reaction of potassium isopropyl mercaptolate with fluorobenzene chromium tricarbonyl yields isopropylmercaptobenzene chromium tricarbonyl. When the reaction is repeated using sodium phenyl mercaptolate, the product is phenylmercaptobenzene chromium tricarbonyl.

EXAMPLE IX

*Phenylation of cholesterol*

Cholesterol, 0.145 part, was dissolved in benzene, 1.6 parts, and dimethyl sulfoxide, 2.2 parts, was added. Cholesterol was converted to its anion by titration with

TABLE II

| Alcohol | Titer, moles | Product | Yield percent, Chr., Cr. | Found | | Required | | Uncorrected M.P., degrees |
|---|---|---|---|---|---|---|---|---|
| | | | | C | H | C | H | |
| 1. n-Butanol | 0.99 | $C_4H_9OC_6H_5Cr(CO)_3$ | 96, 84 | 54.76 | 5.19 | 54.54 | 4.93 | 60 |
| 2. i-Propanol | 1.07 | $(CH_3)_2CHOC_6H_5Cr(CO)_3$ | 94, 76 | 52.83 | 4.48 | 52.94 | 4.44 | 72–3 |
| 3. t-Butanol | 1.04 | $(CH_3)_3COC_6H_5Cr(CO)_3$ | 80, 68 | 54.45 | 4.88 | 54.54 | 4.93 | 68–9 |
| 4. Neo-pentanol | 1.12 | $(CH_3)_3CCH_2OC_6H_5Cr(CO)_3$ | 94, 85 | 56.12 | 5.45 | 56.00 | 5.37 | 109–110 |
| 5. Benzyl alcohol | 1.05 | $C_6H_5CH_2OC_6H_5Cr(CO)_3$ | 98, 92 | 60.56 | 4.01 | 60.01 | 3.78 | 108–9 |
| 6. Benzyl mercaptan | 0.98 | $C_6H_5SC_6H_5Cr(CO)_3$ | 94, 83 | 57.40 | 3.86 | 57.15 | 3.60 | 107–8 |

The process of Example IV is repeated using dimsyllithium and dimsylpotassium in place of dimsylsodium. Similar results are obtained.

When the process is repeated using dimsylpotassium and fluorobenzene molybdenum tricarbonyl, the products are the corresponding alkoxy derivatives of benzene molybdenum tricarbonyl. Similarly, when the alcohols employed in Example IV are reacted with fluorobenzene tungsten tricarbonyl, the products are the corresponding alkoxy benzene tungsten tricarbonyls.

EXAMPLE V

Sodium isoamyl alcoholate and fluorobenzene chromium tricarbonyl are reacted in dimethyl sulfoxide solution. The product is isoamyloxybenzene chromium tricarbonyl.

dimsylsodium solution with triphenylmethane as the indicator. Fluorobenzene chromium tricarbonyl, 0.116 part, was added and the solution was shaken for about two minutes. About 50 mls. of 2 N hydrochloric acid was added. The mixture was extracted with ether and the ether solution chromatographed on activated alumina. The product, the [pi-(tricarbonylchromium) phenyl] ether of cholesterol, was eluted from the column. Upon recrystallization, 0.168 part of product, M.P. 174° C. (dec.) was isolated. Analysis: calculated for C, 72.7; H, 8.8. $C_{36}H_{50}O_4Cr$ requires C, 72.2; H, 8.4 percent. Another name for the product of this process is cholestoxybenzene chromium tricarbonyl.

Similar results are obtained when other sterols, i.e., cholic acid and androsterone, are employed in the process.

EXAMPLE X

*Preparation of substituted aniline chromium tricarbonyls*

An amine or amine derivative 0.40 millimole, dissolved in dimethyl sulfoxide, 1 ml., was converted into its anion by titration with dimsylsodium in the absence of air. Diphenylamine, pyrrole and benzamide could be titrated using triphenylmethane as an indicator. Aniline and n-methylaniline (presumably stronger bases than the trityl anion) could not be colormetrically titrated but were treated with theoretical equivalents of reagent. Fluorobenzene chromium tricarbonyl, 0.50 millimole, was added. The reaction mixture quenched with about 50 mls. of 2 N-hydrochloric acid. The resulting mixture was extracted with ether and the ether solution chromatographed on activated alumina. The product bands were eluted from the column and recrystallized as in Examples IV and IX. Aniline yielded two products: a mono-complex, N(phenyl)aniline chromium tricarbonyl, $$C_6H_5NHC_6H_5Cr(CO)_3$$

and a bis-complex N,N-bis(phenyl chromium tricarbonyl) aniline, $C_6H_5N(C_6H_5[Cr(CO)_3])_2$.

The results obtained are summarized in Table III. Unless otherwise indicated in the table, the reaction time after addition of the fluorobenzene chromium tricarbonyl compound to the titrated solution was one minute.

EXAMPLE XII

Fluorobenzene chromium tricarbonyl is reacted with sodium-o-toluidinate in the presence of dimethyl sulfoxide solution. The product is a mixture of N-o-tolylaniline chromium tricarbonyl;

$$o\text{-}CH_3\text{---}C_6H_4N(H)C_6H_5Cr(CO)_3$$

N,N-bis(phenyl chromium tricarbonyl)-o-toluidine, and $$o\text{-}CH_3\text{---}C_6H_4N[C_6H_5Cr(CO)_3]_2.$$

Similarly, when sodium 1,3,5-triisopropyl anilide is reacted with 1,3,5-triisopropyl fluorobenzene chromium tricarbonyl, in dimethyl sulfoxide solution, the product is a mixture of N[1,3,5-triisopropyl]phenyl-1,3,5-triisopropyl aniline chromium tricarbonyl and N,N-bis(1,3,5-triisopropylphenyl chromium tricarbonyl) 1,3,5-triisopropyl aniline.

Similar results were obtained when fluorobenzene molybdenum tricarbonyl and fluorobenzene tungsten tricarbonyl were employed in the process.

EXAMPLE XIII

*Preparation of hydrocarbon-substituted benzene chromium tricarbonyls*

A number of carbanions were prepared by titration of a carbon acid with dimsylsodium and these were reacted

TABLE III

| Nitrogen acid | Titer, moles | Product | Yield Percent, Chr., Cr | Found | | | Required | | |
|---|---|---|---|---|---|---|---|---|---|
| | | | | C | H | N | C | H | N |
| 1. Aniline (16 hr.) | | $\{C_6H_5NHC_6H_5Cr(CO)_3$ | 28, 18 | 58.80 | 3.47 | 4.33 | 59.02 | 3.63 | 4.59 |
| | | $\{C_6H_5N(C_6H_5Cr(CO)_3)_2$ | 9, 6 | 55.79 | 3.13 | 2.76 | 55.73 | 2.92 | 2.71 |
| 2. Aniline (46 hr.) | | $\{C_6H_5NHC_6H_5Cr(CO)_3$ | 22, 16 | | | | | | |
| | | $\{C_6H_5N(C_6H_5Cr(CO)_3)_2$ | 16, 13 | | | | | | |
| 3. N-methylaniline | | $C_6H_5N(CH_3)C_6H_5Cr(CO)_3$ | 72, 63 | 59.99 | 3.98 | 4.08 | 60.19 | 4.10 | 4.39 |
| 4. Diphenylamine | 1.00 | $(C_6H_5)_2NC_6H_5Cr(CO)_3$ | 89, 80 | 66.07 | 3.91 | 3.77 | 66.12 | 3.97 | 3.67 |
| 5. Pyrrole | 1.01 | $C_4H_4NC_6H_5Cr(CO)_3$ | 94, 89 | 55.79 | 3.08 | 5.64 | 55.93 | 3.25 | 5.02 |
| 6. Benzamide | 1.00 | $C_6H_5C(O)N(H)C_6H_5Cr(CO)_3$ | 45, 39 | 57.89 | 3.22 | 4.06 | 57.66 | 3.33 | 4.20 |

When the process of Example X is repeated using sodium propionamidate, potassium 3,5-diethylbenzamidate, sodium-p-toluamidate, and sodium N-tridecyl-2-cyclohexyl acetamidate, the product is N-propionylaniline chromium tricarbonyl, N-[3,5-diethyl] benzoylaniline chromium tricarbonyl N-p-methylbenzoylaniline chromium tricarbonyl, and N-tridecyl-N-[2-cyclohexyl] acetylaniline chromium tricarbonyl, respectively.

with fluoro-benzene chromium tricarbonyl as described in Example IV. The results are summarized in Table IV.

TABLE IV

| Carbanion from— | Titer Moles | Product | Yield Percent, Chr., Cr. | Found | | Required | | M.P., degrees |
|---|---|---|---|---|---|---|---|---|
| | | | | C | H | C | H | |
| 1. φ₃CH | | $\{(C_6H_5)_3CC_6H_5Cr(CO)_3$ | 40, 29 | 73.84 | 4.86 | 73.63 | 4.42 | |
| | | $\{(C_6H_5)_3CC_6H_5Cr(CO)_3$ | 40, 33 | | | | | |
| 2. Indene | 1.01 | $C_9H_7C_6H_5Cr(CO)_3$ | 62, 54 | 64.95 | 3.78 | 65.86 | 3.78 | |
| 3. Cyclohexanone | 0.99 | $C_6H_9(O)C_6H_5Cr(CO)_3$ | 37, 32 | | | | | |
| (1.5 hr.) | 1.02 | $C_6H_9(O)C_6H_5Cr(CO)_3$ | 29, 21 | 57.89 | 4.44 | 58.06 | 3.73 | 134-5 |
| (16 hr.) | 1.03 | $C_6H_9(O)C_6H_5Cr(CO)_3$ | 23, 18 | | | | | |
| 4. Acetone | 1.01 | $CH_3C(O)CH_2C_6H_5Cr(CO)_3$ | 19, 15 | 53.42 | 4.20 | 53.33 | 3.73 | 49-50 |
| 5. Cyclopentadiene | 1.03 | $C_5H_5C_6H_5Cr(CO)_3$ | 54, 36 | 60.60 | 3.17 | 60.43 | 3.62 | 95-6 |
| 6. Phenylacetylene | 0.97 | $C_6H_5C\equiv CC_6H_5Cr(CO)_3$ | 54, 26 | 64.67 | 3.29 | 64.97 | 3.21 | 87-8 |

EXAMPLE XI

Sodium ethylmethyl amilide is reacted with fluorobenzene chromium tricarbonyl in dimethyl sulfoxide solution. The product is N-methyl-N-ethylaniline chromium tricarbonyl. When the reaction is repeated using sodium-N-tridecylanilide, the product is N-tridecyl-N-phenylaniline chromium tricarbonyl.

EXAMPLE XIV

When the process of Example XIII is repeated using tert-butylcyclopentadiene, the product is tert-butylcyclopentadienyl benzene chromium tricarbonyl. Similarly, methylindene yields methylindenylbenzene chromium tricarbonyl.

EXAMPLE XV

When the process of Example XIII is repeated using acetophenone, the product is benzoylmethylbenzene chromium tricarbonyl. When the reaction is repeated using dibenzyl ketone, the product is $$C_6H_5\text{---}CH_2\text{---}\overset{O}{\underset{\|}{C}}\text{---}\overset{H}{\underset{|}{C}}(C_6H_5)\text{---}C_6H_5Cr(CO)_3$$

To further demonstrate the utility of the dimethyl sulfoxide solutions of anions derived from carbon acids by reacting a carbon acid with dimsylsodium, the following examples are presented.

EXAMPLE XVI

*Preparation of benzoyl acetic acid*

Acetophenone, 0.6 part, in dimethyl sulfoxide, 5.5 parts, was quantitatively converted into its anion by titration with dimsylsodium solution, using triphenylmethane as an indicator as described in Examples II and III. The resultant solution containing the sodium derivative of acetophenone was poured onto a large excess of solid carbon dioxide. After evaporation of the carbon dioxide, 10 parts of water was added and the solution made acidic with dilute sulfuric acid. The product, benzoyl acetic acid, was extracted into ether. The ether solution was washed with dilute acid, dried and evaporated to dryness. The product was recrystallized from ether yielding 0.32 part of pure benzoyl acetic acid, M.P. 101° C.

EXAMPLE XVII

*Preparation of phenyl propiolic acid*

Phenyl acetylene, 1.02 parts, was converted to its sodium derivative as described in Examples II and III and carboxylated by the method described in Example IV. After recrystallization, phenyl propiolic acid, 0.85 part, M.P. 137–138° C. was obtained.

Many of the compounds prepared by the processes of this invention broadly belong to known classes of compounds and have the well-known utilities of compounds in those classes. The arene Group VIB metal tricarbonyls afforded by this process are useful as fuel and lubricant additives, fungicides, and chemical intermediates.

Moreover, many of these compounds have utility as pharmaceuticals.

The compounds produced by the process of this invention are useful as metal plating agents. For example, when a glass cloth is placed in a sealed tube with N,N-bis(phenyl chromium tricarbonyl) aniline and the mixture heated to about 300° C., the cloth is coated with a chromium-containing deposit.

Having fully described the novel process of this invention, the products produced thereby, and their many utilities, I desire to be limited only within the lawful scope of the appended claims.

I claim:

1. [Pi-(tricarbonyl chromium)phenyl] ether of cholesterol.
2. A process for the preparation of a substituted arene Group VIB metal tricarbonyl having the formula:

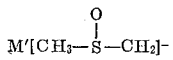

wherein
 R is an alkyl radical having from 1 to about 3 carbon atoms,
 $a$ is an integer having a value of zero to three,
 M is a Group VIB metal, and
 T is a substituent group selected from the class consisting of alkoxide, phenoxide, mercapto, amino, amido, cyclopentadienyl, alkynyl, triarylmethyl, and ketonyl radicals;

said process comprising:
 (A) reacting, in the presence of dimethyl sulfoxide, a compound selected from the class consisting of alcohols, phenols, mercaptans, primary and secondary amines, amides having at least one hydrogen bonded to the amido nitrogen atom, terminal acetylenes having at least three carbon atoms, cyclopentadienes, ketones and triaryl methanes; with an alkali metal salt of the conjugate base of dimethyl sulfoxide, said salt having the formula

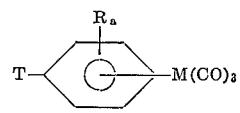

wherein M' is an alkali metal; whereby a dimethyl sulfoxide solution of an alkali metal nucleophilic reagent having the formula M'T is produced, wherein M' and T are as defined above; and
 (B) subsequently reacting said alkali metal nucleophilic reactant in said dimethyl sulfoxide solution with a halogen-substituted arene Groupe VIB metal tricarbonyl having the formula:

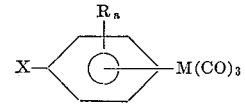

wherein X is a halogen and R, $a$, and M are as defined above.

3. A process for the preparation of a substituted arene Group VIB metal tricarbonyl having the formula:

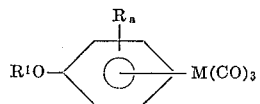

wherein
 R is an alkyl radical having from 1 to about 3 carbon atoms,
 $a$ is an integer having a value of zero to three,
 M is a Group VIB metal, and
 $R^1$ is a univalent radical selected from the class consisting of the cholestenyl radical and hydrocarbon radicals having from 1 to about 13 carbon atoms, said hydrocarbon radicals being selected from the class consisting of alkyl, cycloalkyl, aralkyl, aryl and alkaryl radicals, said process comprising (A) reacting, in the presence of dimethyl sulfoxide, an alcohol selected from the class consisting of cholesterol, and hydrocarbon alcohols having from 1 to about 13 carbon atoms, said hydrocarbon alcohols being selected from the class consisting of alkyl, cycloalkyl, aralkyl, aryl, and alkaryl alcohols; with an alkali metal salt of the conjugate base of dimethyl sulfoxide, said salt having the formula:

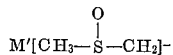

wherein M' is an alkali metal; whereby a dimethyl sulfoxide solution of an alkali metal alkoxide is produced; and (B) subsequently reacting said alkali metal alkoxide in said dimethyl sulfoxide solution with a halogen-substituted arene Group VIB metal tricarbonyl having the formula:

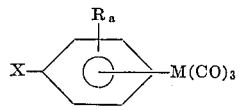

wherein X is a halogen and R, $a$, and M are as defined above.

4. Process for the preparation of n-butoxybenzene chromium tricarbonyl, said process comprising (A) reacting, in the presence of dimethyl sulfoxide, butyl alcohol with an alkali metal salt of the conjugate base of dimethyl sulfoxide, said salt having the formula

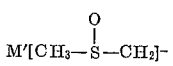

wherein M' is an alkali metal; whereby a dimethyl sulfoxide solution of an alkali metal butoxide is produced; and (B) subsequently reacting said alkali metal butoxide in said dimethyl sulfoxide solution with fluorobenzene chromium tricarbonyl.

5. Process for the preparation of isopropoxybenzene chromium tricarbonyl, said process comprising (A) reacting, in the presence of dimethyl sulfoxide, isopropyl alcohol with an alkali metal salt of the conjugate base of dimethyl sulfoxide, said salt having the formula

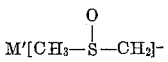

wherein M' is an alkali metal; whereby a dimethyl sulfoxide solution of an alkali metal isopropoxide is produced; and (B) subsequently reacting said alkali metal isopropoxide in said dimethyl sulfoxide solution with fluorobenzene chromium tricarbonyl.

6. A process for the preparation of n-butoxybenzene chromium tricarbonyl, said process comprising:
(A) reacting, in dimethyl sulfoxide solution, n-butanol with a substantially stoichiometric amount of dimsylsodium; whereby a dimethyl sulfoxide solution of sodium butoxide is produced; and
(B) subsequently reacting said sodium butoxide in said dimethyl sulfoxide solution with fluorobenzene chromium tricarbonyl;
said process being carried out at a temperature between about 15° to about 25° C.

7. A process for the preparation of a substituted arene Group VIB metal tricarbonyl having the formula:

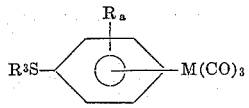

wherein
R is an alkyl radical having from 1 to about 3 carbon atoms,
a is an integer having a value of zero to three.
M is a Group VIB metal, and
R³ is a univalent radical selected from the class consisting of hydrocarbon radicals having from 1 to about 13 carbon atoms, said hydrocarbon radicals being selected from the class consisting of alkyl, cycloalkyl, aralkyl, aryl and alkaryl radicals,
said process comprising (A) reacting, in the presence of dimethyl sulfoxide, a mercaptan having from 1 to about 13 carbon atoms and being selected from the class consisting of alkyl, cycloalkyl, aralkyl, aryl, and alkaryl mercaptans, with an alkali metal salt of the conjugate base of dimethyl sulfoxide, said salt having the formula:

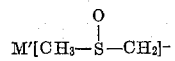

wherein M' is an alkali metal; whereby a dimethyl sulfoxide solution of an alkali metal mercaptolate is produced; and (B) subsequently reacting said alkali metal mercaptolate in said dimethyl sulfoxide solution with a halogen-substituted arene Group VIB metal tricarbonyl having the formula

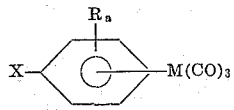

wherein X is a halogen and R, a, and M are as defined above.

8. Process for the preparation of benzylmercaptobenzene chromium tricarbonyl, said process comprising (A) reacting, in the presence of dimethyl sulfoxide, benzyl mercaptan with an alkali metal salt of the conjugate base of dimethyl sulfoxide, said salt having the formula:

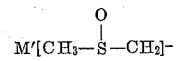

wherein M' is an alkali metal; whereby a dimethyl sulfoxide solution of an alkali metal benzyl mercaptolate is produced; and (B) subsequently reacting said alkali metal benzyl mercaptolate in said dimethyl sulfoxide solution with fluorobenzene chromium tricarbonyl.

9. A process for the preparation of a substituted arene Group VIB metal tricarbonyl having the formula:

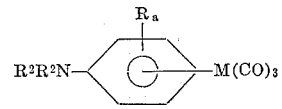

wherein
R is an alkyl radical having from 1 to about 3 carbon atoms,
a is an integer having a value of zero to three,
M is a Group VIB metal,
R² is a univalent radical selected from the class consisting of the hydrogen radical and hydrocarbon radicals having from one to about 13 carbon atoms, said hydrocarbon radicals being selected from the class consisting of alkyl, cycloalkyl, aralkyl, aryl, and alkaryl radicals, and
R³ is a univalent hydrocarbon radical having from 2 to about 13 carbon atoms, said radical being selected from the class consisting of alkyl, cycloalkyl, aralkyl, aryl and alkaryl radicals,
said process comprising (A) reacting, in the presence of dimethyl sulfoxide, an amine having from 2 to about 13 carbon atoms, said amines being selected from the class consisting of alkyl, cycloalkyl, aralkyl, aryl and alkaryl amines, with an alkali metal salt of the conjugate base of dimethyl sulfoxide, said salt having the formula:

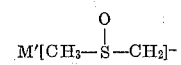

wherein M' is an alkali metal; whereby a dimethyl sulfoxide solution of an alkali metal aminate is produced; and (B) subsequently reacting said alkali metal aminate in said dimethyl sulfoxide solution with a halogen-substituted arene Group VIB metal tricarbonyl having the formula:

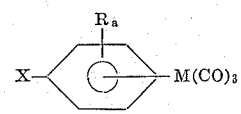

wherein X is a halogen and R, a, and M are as defined above.

10. Process for the preparation of N-methyl-N-phenylaniline chromium tricarbonyl, said process comprising (A) reacting, in the presence of dimethyl sulfoxide,

with the sodium salt of the conjugate base of dimethyl sulfoxide, said salt having the formula:

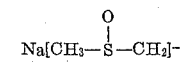

whereby a dimethyl sulfoxide solution of the sodium aminate of N-methylaniline is produced; and (B) subsequently reacting said sodium aminate in said dimethyl sulfoxide solution with a fluorobenzene chromium tricarbonyl.

11. A process for the preparation of a substituted arene Group VIB metal tricarbonyl having the formula:

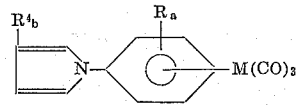

wherein
R is an alkyl radical having from 1 to about 3 carbon atoms,
a is an integer having a value of zero to three,
M is a Group VIB metal, and
R⁴ is an alkyl radical having from 1 to about 4 carbon atoms, and
b is an integer having a value of zero to four;

said process comprising (A) reacting, in the presence of dimethyl sulfoxide, a pyrrole having the formula:

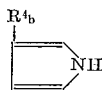

wherein $R^4$ and $b$ are as defined above, with an alkali metal salt of the conjugate base of dimethyl sulfoxide, said salt having the formula:

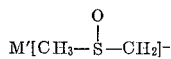

wherein M′ is an alkali metal; whereby a dimethyl sulfoxide solution of an alkali metal aminate of said pyrrole is produced; and (B) subsequently reacting said alkali metal aminate in said dimethyl sulfoxide solution with a halogen-substituted arene Group VIB metal tricarbonyl having the formula:

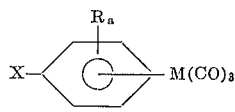

wherein X is a halogen and R, $a$, and M are as defined above.

12. A process for the preparation of a substituted arene Group VIB metal tricarbonyl having the formula:

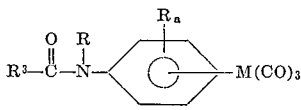

wherein
R is an alkyl radical having from 1 to about 3 carbon atoms,
$a$ is an integer having a value of zero to three,
M is a Group VIB metal,
$R^2$ is a univalent radical selected from the class consisting of the hydrogen radical and hydrocarbon radicals having from one to about 13 carbon atoms, said hydrocarbon radicals being selected from the class consisting of alkyl, cycloalkyl, aralkyl, aryl, and alkaryl radicals, and
$R^3$ is a univalent hydrocarbon radical having from 2 to about 13 carbon atoms, said radical being selected from the class consisting of akyl, cycloalkyl, aralkyl, aryl and alkaryl radicals,
said process comprising (A) reacting, in the presence of dimethyl sulfoxide, an amide having the formula:

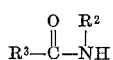

wherein $R^2$ and $R^3$ are as defined above, with an alkali metal salt of the conjugate base of dimethyl sulfoxide, said salt having the formula:

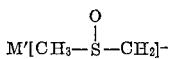

wherein M′ is an alkali metal; whereby a dimethyl sulfoxide solution of an alkali metal amidate is produced; and (B) subsequently reacting said alkali metal amidate in said dimethyl sulfoxide solution with a halogen-subsituted arene Group VIB metal tricarbonyl having the formula:

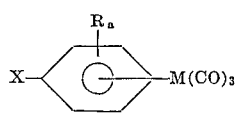

wherein X is a halogen and R, $a$, and M are as defined above.

13. A process for the preparation of a substituted arene Group VIB metal tricarbonyl having the formula:

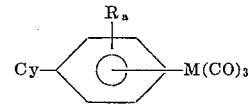

wherein
R is an alkyl radical having from 1 to about 3 carbon atoms,
$a$ is an integer having a value of zero to three,
M is a Group VIB metal, and
Cy is a cyclopentadienyl radical selected from the class consisting of the cyclopentadienyl radical, $C_5H_5$—, and hydrocarbon-substituted cyclopentadienyl radicals free of triple bonds and having from 6 to about 13 carbon atoms,
said process comprising (A) reacting, in the presence of dimethyl sulfoxide, a cyclopentadiene selected from the class consisting of cyclopentadiene, $C_5H_6$, and hydrocarbon-substitued cyclopentadienes free from triple bonds and having from 6 to about 13 carbon atoms, with an alkali metal salt of the conjugate base of dimethyl sulfoxide, said salt having the formula:

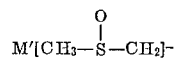

wherein M′ is an alkali metal; whereby a dimethyl sulfoxide solution of an alkali metal cyclopentadiene is produced; and (B) subsequently reacting said alkali metal cyclopentadienide in said dimethyl sulfoxide solution with a halogen-substituted arene Group VIB metal tricarbonyl having the formula:

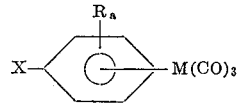

wherein X is a halogen and R, $a$, and M are as defined above.

14. A process for the preparation of a substituted arene Group VIB metal tricarbonyl having the formula:

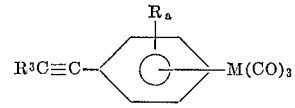

wherein
R is an alkyl radical having from 1 to about 3 carbon atoms,
$a$ is an integer having a value of zero to three,
M is a Group VIB metal, and
$R^3$ is a univalent hydrocarbon radical having up to about 13 carbon atoms, said radical being selected from the class consisting of alkyl, cycloalkyl, aralkyl, aryl and alkaryl radicals,
said process comprising (A) reacting, in the presence of dimethyl sulfoxide, an acetylene having from 2 to about 15 carbon atoms and being selected from the class consisting of alkyl, cycloalkyl, aralkyl, aryl, and alkaryl acetylenes, with an alkali metal salt of the conjugate base of dimethyl sulfoxide, said salt having the formula:

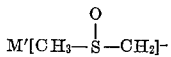

wherein M′ is an alkali metal; whereby a dimethyl sulfoxide solution of an alkali metal acetylide is produced, and (B) subsequently reacting said alkali metal acetylide in said dimethyl sulfoxide solution with a halogen-substituted arene Group VIB metal tricarbonyl having the formula:

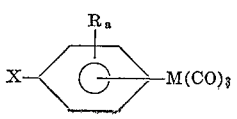

wherein X is a halogen and R, *a*, and M are as defined above.

15. A process for the preparation of a substituted arene Group VIB metal tricarbonyl having the formula:

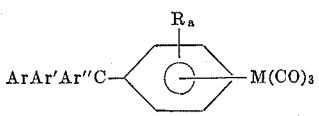

wherein
R is an alkyl radical having from 1 to about 3 carbon atoms,
*a* is an integer having a value of zero to three,
M is a Group VIB metal, and
Ar, Ar' and Ar'' are aryl radicals having from 6 to about 10 carbon atoms;
said process comprising (A) reacting, in the presence of dimethyl sulfoxide, a triarylmethane wherein the aryl radicals are as defined above, with an alkali metal salt of the conjugate base of dimethyl sulfoxide, said salt having the formula:

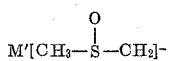

wherein M' is an alkali metal; whereby a dimethyl sulfoxide solution of an alkali metal triarylmethanide is produced; and (B) subsequently reacting said alkali metal methanide in said dimethyl sulfoxide solution with a halogen-substituted arene Group VIB metal tricarbonyl having the formula:

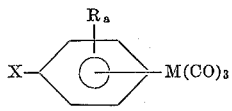

wherein X is a halogen and R, *a*, and M are as defined above.

16. A process for the preparation of a substituted arene Group VIB metal tricarbonyl having the formula:

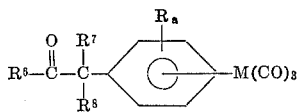

wherein
R is an alkyl radical having from 1 to about 3 carbon atoms,
*a* is an integer having a value of zero to three,
M is a Group VIB metal, and
$R^6$, $R^7$ and $R^8$ are univalent radicals independently selected from the class consisting of the hydrogen radical and hydrocarbon radicals having from 1 to about 13 carbon atoms, said hydrocarbon radicals being selected from the class consisting of alkyl, cycloalkyl, aralkyl, aryl and alkaryl radicals, such that the total number of carbon atoms in $R^6$, $R^7$ and $R^8$ does not exceed about 13;
said process comprising (A) reacting, in the presence of dimethyl sulfoxide, a ketone having the formula:

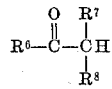

wherein $R^6$, $R^7$ and $R^8$ are as defined above, said ketone being selected from the class consisting of alkyl, cycloalkyl, aralkyl, aryl, and alkaryl ketones, such that the total number of carbon atoms in $R^6$, $R^7$ and $R^8$ does not exceed about 13, with an alkali metal salt of the conjugate base of dimethyl sulfoxide, said salt having the formula

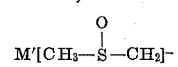

wherein M' is an alkali metal; whereby a dimethyl sulfoxide solution of an alkali metal ketonide is produced; and (B) subsequently reacting said alkali metal ketonide in said dimethyl sulfoxide solution with a halogen-substituted arene Group VIB metal tricarbonyl having the formula:

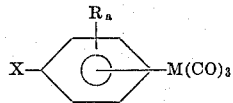

wherein X is a halogen and R, *a*, and M are as defined above.

References Cited by the Examiner

Calderazzo et al.: La Ricerca Scientifica, vol. 29, December 1959.

TOBIAS E. LEVOW, *Primary Examiner.*